United States Patent [19]
Eck

[11] 3,718,051
[45] Feb. 27, 1973

[54] POWER TRANSFER SYSTEM

[76] Inventor: Francis B. Eck, 605 Brookline Dr. S.E., Marietta, Ga.

[22] Filed: Feb. 1, 1971

[21] Appl. No.: 111,450

[52] U.S. Cl. ..................74/216.3, 74/422, 74/425, 74/797
[51] Int. Cl..........F16h 13/04, F16h 1/04, F16h 1/16
[58] Field of Search..............74/216.3, 797, 425, 422

[56] References Cited

UNITED STATES PATENTS

| 3,552,222 | 1/1971 | Eck .....................................74/216.3 |
| 585,135 | 6/1897 | Thomas et al........................74/216.3 |
| 2,491,764 | 12/1949 | Quillen..................................74/216.3 |
| 2,551,821 | 5/1951 | Bengtson..............................74/216.3 |
| 2,817,256 | 12/1957 | Malone et al....................74/216.3 X |
| 3,009,723 | 11/1961 | Patrignani ......................74/216.3 X |

FOREIGN PATENTS OR APPLICATIONS

| 1,324,385 | 3/1963 | France .................................74/216.3 |
| 488,549 | 12/1953 | Italy .....................................74/216.3 |

*Primary Examiner*—Leonard H. Gerin
*Attorney*—Jones & Thomas

[57] ABSTRACT

A power transfer system consisting of sprocket housings whose ports are inter-connected by flexible or formable or pre-shaped tubes, the tubes and the sprocket housings forming an endless track through which a plurality of juxtaposed spheres or balls are passed. The rotation of a sprocket in one housing causes transfer of the balls in their continuous path so as to rotate the sprocket in the other housing. Each sprocket is bifurcated and an arcuate member is placed adjacent the sprockets to facilitate the transfer of the balls from the housings to the tubes. A quick disconnect assembly is provided between the ports of each housing and the tubes, by which the tubes may be readily disconnected. The inadvertent discharge of the balls from the tubes and the housings is prevented by check members. The sprocket of the present invention cooperates, in certain embodiments with a pinion or a rack or a worm gear or a planetary arrangement.

10 Claims, 16 Drawing Figures

PATENTED FEB 27 1973

POWER TRANSFER SYSTEM

BACKGROUND OF THE INVENTION

This invention relates to a power transfer system and is more particularly concerned with a flexible or formable or pre-shaped tubular members for transferring power from one shaft to another with an increase or decrease in mechanical advantage by means of recirculated unconnected elements engaging toothed gears.

In the past, power transfer systems of the present type herein disclosed have been devised which comprise a continuous path extending between two housings in hollow tubes, through which a plurality of juxtaposed balls are passed. Toothed sprockets within the two opposed housings are contacted by the balls so that the rotation of one sprocket drives the balls for rotating the other sprocket. The prior art devices, however, have disadvantages in that the friction between the balls and the housings cause the devices to operate at a low mechanical efficiency, especially at high operational speeds, and the fingers of the sprockets do not facilitate the ready transfer of a ball from the sprocket into the tube. The housings represent a departure from prior art because the balls make minimum contacts with them while engaged by the sprocket resulting in increased system efficiency.

SUMMARY OF THE INVENTION

Briefly described the present invention, which obviates the difficulties described above, includes housings which carry sprockets for efficiently receiving and transferring juxtaposed balls. The housings are connected by a pair of flexible or formable or pre-shaped tubes which form a continuous path between the housings so that rotation of one of the sprockets will urge the balls in this continuous path to rotate the sprocket in any other connected housing. Since the tubes are flexible or formable or pre-shaped, the axis of rotation of the sprockets may be altered, as desired, and may be disposed along parallel, intersecting, non-intersecting or other predetermined lines.

The tubes have at their end portions quick disconnect elements provided with detents which prevent the inadvertent spilling of the balls from the tube ends and the spilling of balls from the housing upon disconnection of the tubes from the housings. When the tubes are permanently affixed directly to the ports of the housing, and not readily separated the aforementioned quick disconnect elements and detents are omitted.

In a certain embodiment of the invention, a worm gear operates in conjunction with the sprocket for driving the balls. In another embodiment of the invention the balls constitute a pinion which operates in conjunction with a rack, the rack cooperating with the sprocket. In still another form of the invention, a planetary gear arrangement is provided by the balls and sprockets so that a peripheral gear drives an inner gear or vice versa.

Each of these embodiments of the invention can be arranged in a "closed" system, where the balls are always retained between the teeth of a sprocket, or in an "open" system where the balls move from one sprocket to another through ball conduits.

Accordingly, it is an object of the present invention to provide a power transfer system which can transfer power from one shaft to another, regardless of the respective positions of the two shafts.

Another object of the present invention is to provide a power transfer system of the positive displacement type wherein a shaft along one axis can be rotated to drive a movable shaft which may be shifted into an infinite number of positions.

Another object of the present invention is to provide a power transfer system which can be readily and easily assembled and disassembled. Another object of the present invention is to provide a power transfer system wherein the power is transferred by a plurality of balls riding along a continuous path, the power transfer system being readily disassembled without danger of losing the balls.

Another object of the present invention is to provide in a power transfer system, an arrangement which will readily and easily transfer the balls carried by one tube to a second tube.

Another object of the present invention is to provide, in a power transfer system, for the increase or decrease in the mechanical advantage between two or more shafts, or other mechanical elements.

Other objects, features and advantages of the present invention will become apparent from the following description when taken in conjunction with the accompanying drawings, where like characters of reference designate corresponding parts throughout the several views.

These figures and the following detail description disclose specific embodiments of the invention; however, the inventive concept is not limited thereto since it may be embodied in other forms.

DESCRIPTION OF ILLUSTRATIVE EMBODIMENTS

Figure 10:
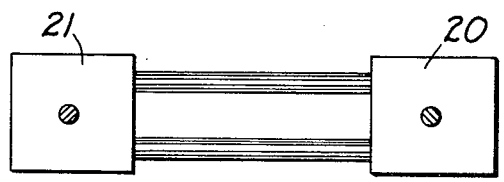
FIG. 10 is a schematic plan view of a power transfer mechanism constructed in accordance with the present invention.
Figure 11:
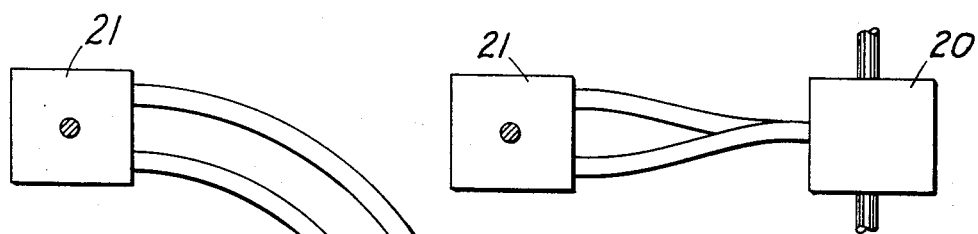
FIG. 11 is a schematic plan view of a power transfer mechanism constructed in accordance with the present invention.
Figure 12:
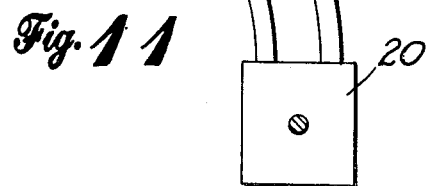
FIG. 12 is a schematic side elevational view of the power transfer mechanism illustrated in FIG. 10 with one of the housings having been rotated 90° from its original position.
Figure 13:
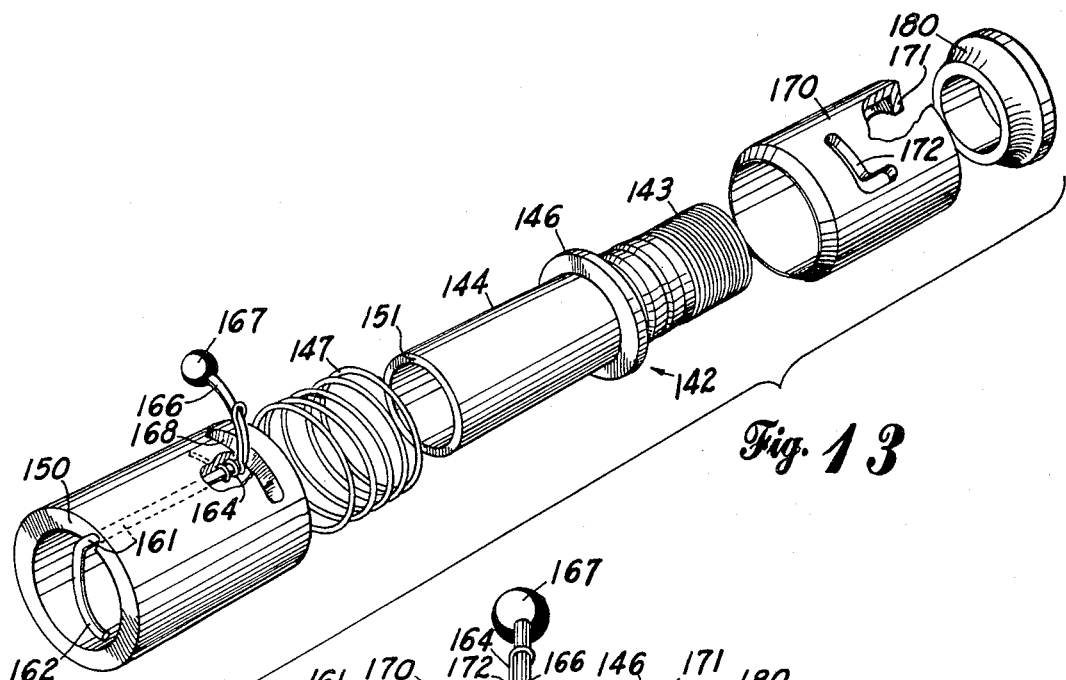
FIG. 13 is an exploded perspective view of a nozzle assembly which can be substituted, when desired, for the nozzle assemblies of the preceeding embodiments.
Figure 14:
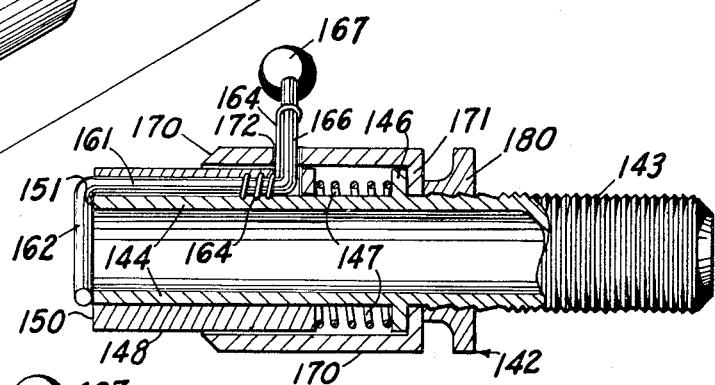
FIG. 14 is a side elevational view, partially broken away, of the nozzle assembly illustrated in FIG. 13.

Referring now in detail to the embodiments chosen for the purpose of illustrating the present invention, numeral 20 denotes generally one of the housings of the system illustrated in FIGS. 1–5, 10, 11 and 12. The second housing 21 as seen in FIGS. 10–12 is identical to the first housing 20 in this embodiment except that it may be of a different size to accommodate a different sprocket, as will be more fully explained hereinafter. Therefore, the details of construction of the housing 20 will be discussed, it being understood that these details also apply to the housing 21.

The housing 20 includes a pair of spaced opposed plates 22 and 23 having semi-circular edges toward their outer portions. The edges of plates 22 and 23 are joined by a wall 24 which extends in a horizontal direction along the upper portion of housing 20 and then curves arcuately downwardly and around so as to terminate in a flat portion parallel to and spaced from the upper portion. The housing also includes an inner wall 25 which extends between the plates 22 and 23 between the upper and lower portions of the wall 24.

The plates 22 and 23 and the walls 24 and 25 define a disc shaped interior 40 within which is disposed a sprocket 26. Walls 22 and 23 are provided with central openings having bushings 27 and 28 which journal the shaft 29 of sprocket 26. Therefore, the sprocket 26 is free to rotate in the cavity created by the plates 22 and 23 and the walls 24 and 25.

The sprocket 26 is circular along its periphery and is provided with a plurality of juxtaposed pockets 30, each of which is concaved and approximately hemispherical. Extending through all of the pockets 30 is a peripheral groove 31, the bottom portion of which terminates below the bottom portion of each cup or pocket 30. The wall 25 is provided with an inwardly extending guide bar 32 which has an arcuate concaved inner surface 33, an upper surface 34 and a lower surface 35, the upper surface 34 being parallel to the lower surface 35 and both surfaces tapering toward the end portions of the arcuate surface 33 so as to intersect therewith approximately tangential to the arcuate surface 33. The bar 32 is appropriately dimensioned to be received in the groove 31.

Figure 1:
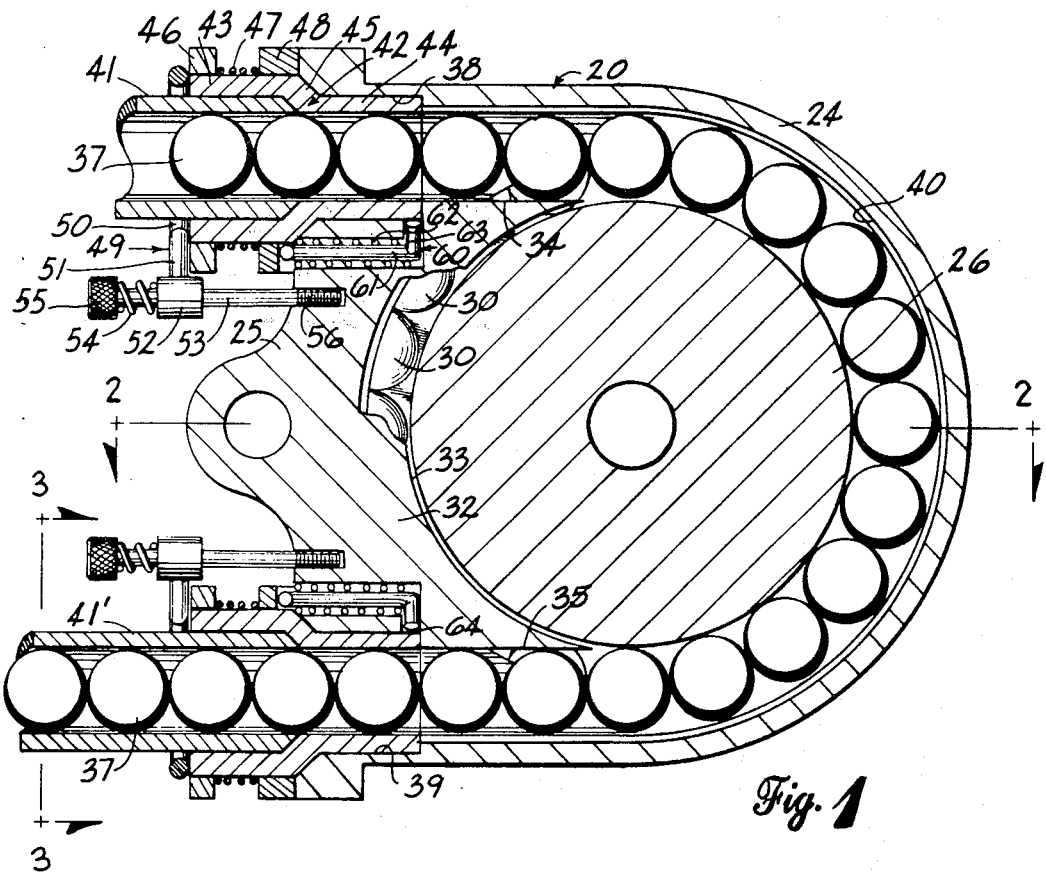
FIG. 1 is a fragmentary, vertical sectional view of one of the housings and the ends of the two tubes forming a portion of the power transfer system of the present invention.
Figure 2:
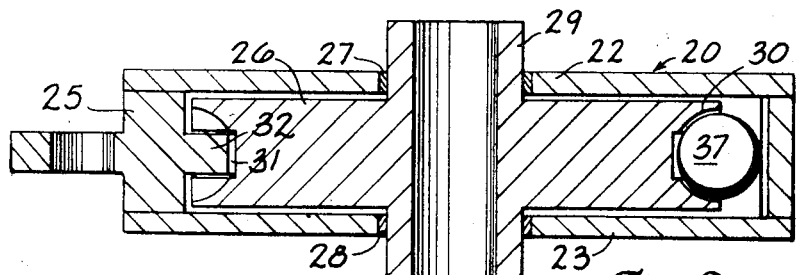
FIG. 2 is a cross-sectional view taken substantially along line 2—2 in FIG. 1.

For feeding a plurality of juxtaposed, preferably nylon balls 37, or balls of lightweight coated or impregnated self-lubricating material, toward and away from the sprocket 26, so that the balls 37 may be carried in an arcuate path, the housing 20 is provided with an upper cylindrical opening 38 and a lower cylindrical opening 39 disposed parallel to each other, adjacent the upper and lower portions of wall 24 respectively. The holes 38 and 39 communicate with the hollow interior 40 of housing 20. The dimensions of wall 24 and sprocket 26 and the cups 30 are so arranged that as a ball 37 is moved to the right in FIG. 1 through port 38, it is received in one of the cups 30 while a successive ball 37 is received in a successive cup 30, the diameter of the cup 30 being approximately equal to the diameter of the sphere forming the ball 37. Hence, upon rotation of the sprocket 26 in a clockwise direction, as illustrated in FIG. 1, the successive balls 37, in tandem juxtaposed position, will be carried around the inner surface of wall 24 and be discharged through the opening 39 at the bottom of housing 20.

For producing a continuous path to and from the housing 20, a pair of flexible or formable or pre-shaped tubes 41 and 41' are provided, the interior of each tube being slightly larger than the diameter of the ball 37. A nozzle assembly, designated generally by numeral 42, is provided at the end of tubes 41 and 41', the tubes 41 and 41' extending into and affixed to the posterior of nozzle assembly 42 is received in the hole 38, the outside diameter of the anterior portion 44 being approximately the same or slightly less than the diameter of hole 38. It will also be observed that the interior or inside diameter of the nozzle assembly 42 is approximately equal to the interior diameter of the tubes 41 and 41' so that the balls 37 may readily pass therethrough and into or out of the housing 20. A tapered intermediate portion 45 connects the posterior portion 43 and anterior portion 44 together. At the posterior portion 43, there is an annular collar 46 which is preshrunk on the end of posterior portion 43 and prevents rearward movement of a coil spring 47. The coil spring 47 urges a sleeve 48 forwardly a short distance, the sleeve 48 being adapted to abut the surface of housing 20 when the nozzle assembly 40 is inserted into the housing and being adapted to yield against the compression of spring 47 when the nozzle assembly 42 is inserted to its full extent into the hole 38.

For retaining the nozzle assembly 42 in place, a latch or detent assembly 49 is provided, the latch or detent assembly including a semi-annular latch or hook 50 which has an inside diameter slightly larger than the diameter of the hose or tube 41. This hook is carried by a shank 51 which, in turn, is carried by a sleeve 52 on a shaft 53. The sleeve 52 is urged inwardly on shaft 53 by a coil spring 54 reacting against the knurled head 55 of the shaft 53. The inner end portion 56 of shaft 53 is threadedly received within a hole in wall 25 so as to dispose the shaft 53 in a position parallel to and below the hole 38. The dimensions are such that when the nozzle assembly 42 is inserted fully into the hole 38, and the sleeve 52 which is urged so as to compress the spring 54, the latch 50 will rotate, adjacent the surface of collar 46 so as to partially circumscribe the tube 41 as it projects from the posterior portion 43 of the nozzle assembly 42. This prevents any appreciable movement of the nozzle assembly 42 outwardly of hole 38, except when the latch 50 is rotated so that the nozzle assembly 42 may clear it.

Figure 5:
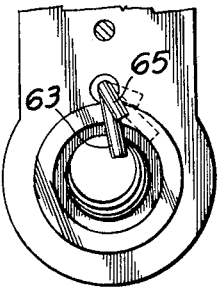
FIG. 5 is a vertical sectional view taken substantially along line 5—5 in FIG. 4.

To prevent the inadvertent spilling of balls 37 out of the housing 20, there is a detent assembly 60 disposed adjacent the hole 38. The nozzle assembly and detent assembly are omitted when the tubes are affixed directly to housing 20 through hole 38 which is sized to accept outside diameter of the tubes 41 and 41'. This detent assembly 60 includes a shaft 61 which is circumscribed by coil spring 62 and disposed within a bore in wall 25, parallel to and adjacent the hole 38. The inner end portion of shaft 61 is provided with an inwardly projecting finger 63 which projects through an appropriate passageway 64 into the path of balls 37. The outer end of shaft 61 is provided with a laterally extending latch arm or lever 65 which is adapted to rotate the shaft 61 and thereby manipulate the finger 64. The spring 61 urges the shaft 60 so as to position the finger 64 in the path of travel of balls which might exit from the housing 20. The lever 65, when rotated out of the path of the anterior portion 44, as it is inserted in the hole 38, will move the finger 63 out of the path of balls 37 so as to enable the nozzle assembly 42 to be inserted fully into the hole 38. In FIG. 5, the position of the lever 65 and finger 63 when the ball blocking position is illustrated is in solid lines. The rotated position of these elements is illustrated in broken lines. It is therefore seen that the detent member 60 will automatically prevent the discharge of balls from the housing 20 when the nozzle assembly 42 is removed therefrom and will automatically permit movement of the balls when the nozzle assembly 42 is inserted into hole 38.

It will be understood that when not affixed directly the two ends of tube 41 and the two ends of tube 41' are provided with identical nozzle assemblies 42 and that the tube 41 leads from one port or hole in housing 21 to one port or hole 38 in housing 20 while the tube 41' leads from the other port or hole 38 in housing 20 to the other port or hole in housing 21.

Figure 3:
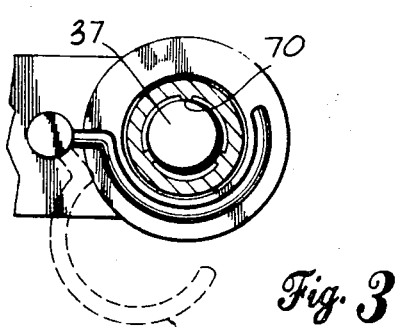
FIG. 3 is a cross-sectional view taken substantially along line 3—3 in FIG. 1.

As seen in FIG. 3, the interior of the anterior portion 44 of nozzle assembly 42 is provided with radial ridges 70 which guide the balls 37 in their path out of the nozzle and onto the edge 34 or 35, as the case may be.

It will be understood by those skilled in the art that in one possible system the plurality of balls 37 form a continuous tandem or juxtaposed group of balls in two paths through the tubes 41 and 41' and around the inside surface of wall 24 of both housings 20 and 21. Upon rotation of the shaft 29 of one of the sprockets 26, the balls will be moved in the hollow cavity 40 of housing 20 so as to push the same through the interior of tube 41 and 41', depending upon the direction of rotation of the sprocket 26. This, in turn, will cause rotation of the sprocket, such as sprocket 26 in the other housing 21. The rotation, of course, will be in the direction of rotation of the sprocket 26 of housing 20.

When the tubes 41 and 41' are flexible, the housing 21 may be disposed in an infinite number of positions, such as are illustrated in FIGS. 10, 11 and 12. Indeed, the housing 21 may be rotated with respect to the housing 20, if so desired.

Figure 6:
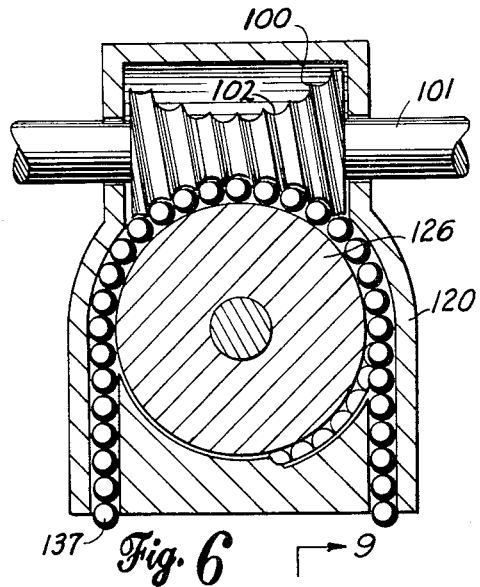
FIG. 6 is a vertical sectional view of a second form of power transfer mechanism produced according to the present invention.

In the embodiment of FIG. 6, it will be seen that, if desired, a worm gear designated generally by numeral 100 may be incorporated with a sprocket 126 which is identical to sprocket 26 in a housing 120 which is identical to housing 20, except that the housing also accommodates the worm gear 100. This worm gear is provided with a shaft 101 projecting through the housing 120 so as to dispose the worm gear 100 adjacent the periphery of sprocket 126. In such an arrangement, the periphery of the worm gear 100 defines grooves 102 which received the outer peripheral portion of each of the balls 137 so as to move the balls successively along a path, thereby rotating the sprocket 126 therewith.

Figure 7:
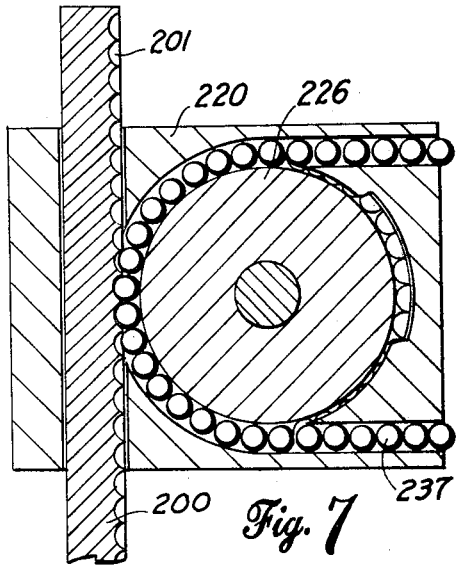
FIG. 7 is a vertical sectional view of a third embodiment of a power transfer mechanism constructed in accordance with the present invention.

In the embodiment of FIG. 7, the sprocket 226 is identical to sprocket 26 and is received in a housing 220 for moving the balls 237 in an arcuate path adjacent a slidable rack 200. The rack 200 is provided with concaved approximately hemispherical cups 201 arranged in succession so as to receive the outer peripheral portions of the successive balls 237 as they are passed by the sprocket or pinion 226 along the outer periphery of its path in housing 220. By manipulation of rack 200, the balls 237 may be caused to move either in a clockwise or counterclockwise direction, as desired, so as to rotate the sprocket 226 in one direction or the other, or the movement of the balls 237 from some external source may cause movement of the rack 200 in either direction.

Figure 8:
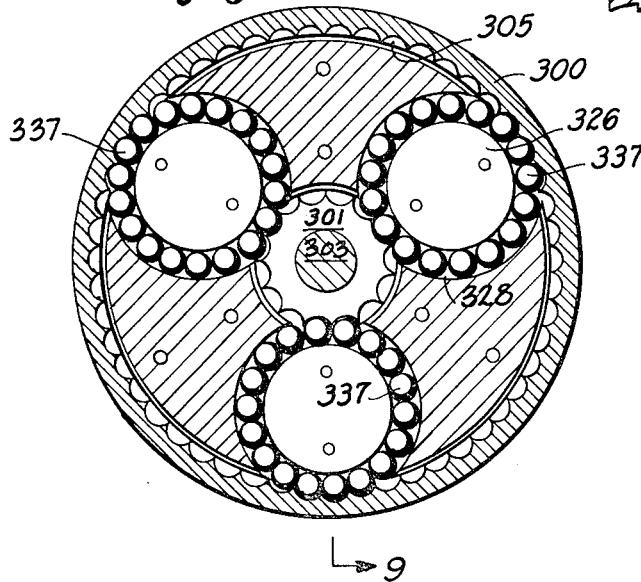
FIG. 8 is a vertical sectional view of a fourth embodiment of a basic device constructed in accordance with the present invention.
Figure 9:
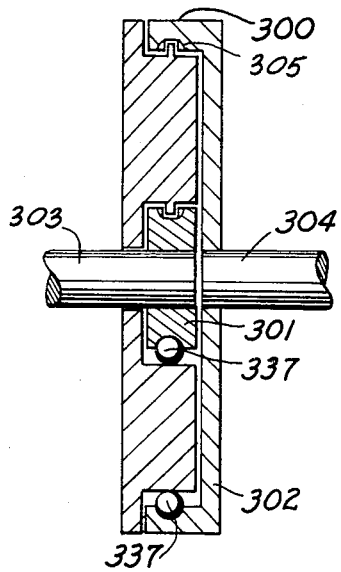
FIG. 9 is a cross-sectional view taken substantially along line 9—9 in FIG. 8.

In FIGS. 8 and 9 a satellite system or planetary gear system is provided and includes annular ring 300 which can rotate or be rotated from a central sprocket 301 disposed concentrically with respect to the ring 300. The ring 300 is carried, as seen in FIG. 9, by a disc shaped plate 302 connected to one side of the ring 300 so that the ring overhangs the sprocket 301. This basic arrangement assumes no shaft thrust loading and maintains perfect alignment and retains shafts 303 and 304. A more practical arrangement would have connected both sides of ring 300 to maintain concentricity about both shafts 303 and 304 by two plates 302. The disc 302 is carried by a shaft 304 concentric with the ring 300. Thus, upon rotation of shaft 304, the ring 300 will be rotated.

The interior periphery of the ring 300 is provided with juxtaposed cups which are approximately hemispherical and open inwardly, the cups being designated by numeral 305. These cups receive balls 337 which are arranged in three rings disposed between the central sprocket 301 and the ring 300, the circle of balls being disposed 120° from each other circumferentially. A guide member 326 having three passages 328 therein connects the balls 337 with both the sprocket 301 and ring 300. Therefore, by rotating shaft 303 connected to sprocket 301 or shaft 304 connected to ring 300, the other shaft will be rotated according to the usual planetary principles.

Although three rings are illustrated, any number of rings can be positioned about a fixed or rotating planet shaft 326 which can be practically installed on the carrier plate 322.

Figure 4:
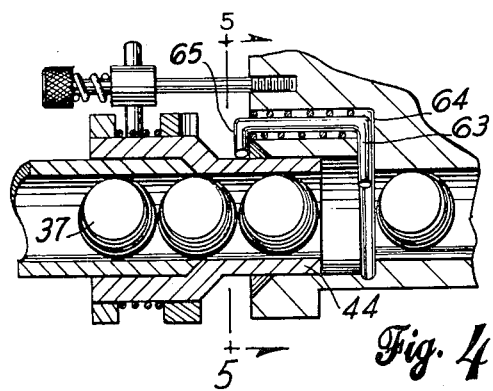
FIG. 4 is a view of a detail showing the removal of one end of the tube from a sprocket housing in the device illustrated in FIG. 1.
Figure 15:
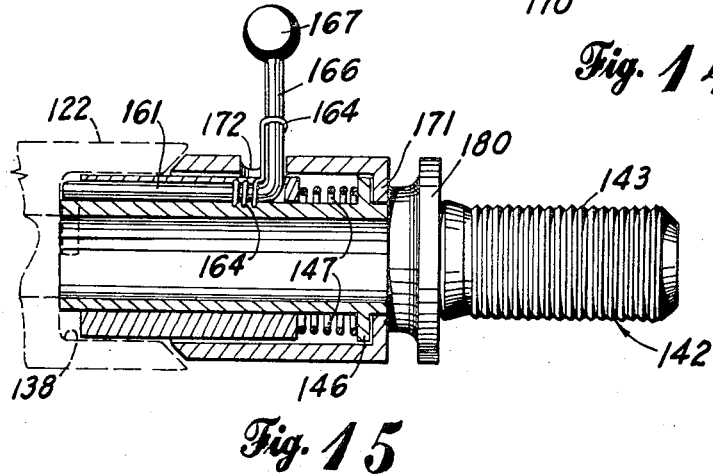
FIG. 15 is a side elevational view partially broken away, similar to FIG. 14 but showing the nozzle assembly inserted in a housing.

Referring specifically to FIGS. 13, 14, 15 and 16, it will be seen that a nozzle assembly, designated generally by numeral 142 is provided which may be substituted for the nozzle assemblies 42, seen best in FIGS. 1 and 4. The purpose of the nozzle assembly 142 is to provide a mechanism by which, when the nozzle assembly is disconnected from the housing, the inadvertent discharge of the balls, such as ball 37, from a tube, such as tubes 41 or 41', will be blocked. In more detail, the nozzle assembly 142 includes a central nozzle having a posterior portion 143 and an anterior portion 144 separated from each other by an annular shoulder 146. As seen in FIG. 15, the anterior portion 144 is adapted to be inserted into a hole or port 138 of a housing 122 and may be retained therein in the same manner as the nozzle assembly 42 of the preceding embodiment. A coil spring 147, which acts against the annular shoulder 146, is helically wound around the anterior portion 144 for continuously urging a sleeve or collar 148 forwardly so that its distal end 150 may extend even with the end 151 of the anterior portion 144 when the nozzle assembly 142 is removed from housing 120.

The sleeve 148 is sufficiently thick to be provided with a bore extending parallel to the axis of sleeve 148 throughout substantially the length of sleeve 148. This bore receives a shaft 161, the forward end of which protrudes beyond the end 150 of the sleeve 148 and is curved downwardly to provide an arcuate blocking finger 162 which has a radius equal approximately to the inner radius of the sleeve 148. Therefore, in one position of shaft 161, the finger 162 lies generally concentrical with the sleeve 148, as illustrated by full lines in FIG. 16 and in another position of shaft 161, the finger 162 projects inwardly as shown by broken lines in FIG. 16.

Figure 16:
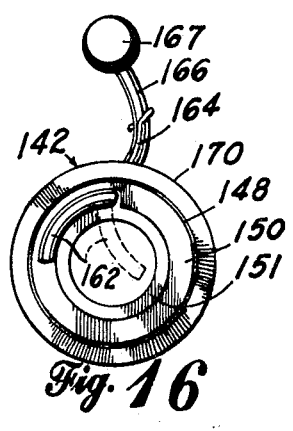
FIG. 16 is an end view of one end of the nozzle assembly illustrated in FIGS. 13, 14 and 15, the broken lines illustrating the position of the finger when it blocks the discharge of balls from a tube.

Coiled around the shaft 161 is helical spring 164 which urges the shaft 161 in a direction to move the finger 162 to the position illustrated by broken lines in FIG. 16. For manipulating the shaft, i.e., rotating the shaft 161 about its axis against spring tension of spring 164, a lever 166 is connected to the other end of shaft 161 and projects outwardly in an arcuate path, the lever 166 being provided with a knob 167 at its outer end. By rotating the lever 166 in a counterclockwise direction from its full line position to its broken line position as illustrated in FIG. 16, the finger 162 can be moved from its full line position to its broken line position. It will be seen that an appropriate slot 168 is provided in the periphery of sleeve 148 in order to permit assembly of nozzle assembly 142 and limited movement of the lever 166.

For limiting the forward movement of the sleeve 148, and for permitting limited rearward movement of the sleeve 161, an outside retaining sleeve 170 is provided, the retaining sleeve 170 having a peripheral inwardly extending flange 171 at its outer end. The flange 171 abuts the peripheral shoulder 146 to limit inward movement of the sleeve 170. The lever 166 protrudes through an L-shaped slot 172 in the sleeve 170, thereby preventing forward and rearward movement of sleeve 148 when the lever 166 is in the circumferential portion of the L-shaped slot. When, however, the lever 166 is pivoted to the position shown in full lines in FIG. 16, the lever 166 is aligned with the radially extending portion of slot 172. Hence, the finger 162 will be retracted to its non-blocking, concentric position while the lever 166 is appropriately positioned so as to permit axial movement of sleeve 148. Thus, as the nozzle assembly 142 is inserted into the port 138, and provided lever 166 is in its appropriate position, the sleeve 148 will be shifted rearwardly against spring 147 to permit the finger 162 to be disposed over the outer periphery of the posterior portion 144. A keeper ring 180 is slid over the anterior portion 143 and abuts the flange 171 so as to prevent inadvertent rearward movement of the retaining sleeve 170 and provides a bearing for a retaining latch similar to the latch 50 in FIG. 1.

It will be understood that a tube (not shown) such as tube 41 or 41' is received on the anterior portion 143 so as to feed balls through the nozzle and into the housing 120. When the nozzle assembly 142 is removed from the housing 120, spring 147 urges the sleeve 148 forwardly, whereby the lever 166 moves from the axial portion of slot 172 into the radial portion so that the spring 164 urges lever 166 in a counterclockwise direction, as viewed in FIG. 16, so that the lever 166 is moved by the spring 164 from its full line position to its broken line position, in FIG. 16. This enables the finger 162 automatically to block the discharge of balls from the nozzle assembly 142 as it is being removed.

While specific embodiments of the invention have been shown and described in detail, modifications, equivalents and substitutions may be used without departing from the inventive concept. For instance, while spherical balls have been illustrated, ball members of various other non-spherical shapes can be utilized if desired as the recirculated unconnected power transmitting elements, and the sprockets can comprise sprocket members of various other tooth arrangement or configuration.

I claim:

1. A power transfer system comprising a housing, a sprocket member rotatably mounted in said housing and including a series of spaced outwardly extending teeth, ball members positioned between at least a series of adjacent ones of the teeth of said sprocket member, and power transfer means in engagement with at least one of the ball members positioned between the teeth of said sprocket member.

2. The power transfer system of claim 1 and wherein said power transfer means comprises a rotatable worm gear.

3. The power transfer system of claim 1 and wherein said power transfer means comprises a rack movable along its length and including rack teeth engaging at least one of the ball members.

4. The power transfer system of claim 1 and wherein said power transfer means comprises a rotatable ring gear including inwardly directed teeth engaging at least one of the ball members.

5. The power transfer system of claim 1 and wherein said housing includes a pair of passageways extending tangentially away from the teeth of said sprocket and wherein ball members are positioned between the teeth of said sprocket member which are located between said passageways, and ball members are positioned in and movable along said passageways.

6. The power transfer system of claim 1 and further including a second housing, at least one conduit member connecting said housings, juxtaposed ball members extending from said sprocket member through said conduit member into said second housing, power converting means engaging at least one of the ball members in said second housing for converting the movement of said ball members into another movement.

7. A power transmission apparatus comprising a sun gear, panetary gear means engaging said sun gear, and a ring gear engaging said planetary gear means, said planetary gear means comprising a spider having at least one continuous passageway intersecting both said sun gear and said ring gear and a plurality of juxtaposed ball members in said passageway with at least one of said ball members engaging said sun gear and at least one of said ball members engaging said ring gear.

8. The power transmission apparatus of claim 7 and wherein said spider is rotatable about the axis of rotation of said sun gear.

9. In a power transmitting apparatus of the type including a housing, a rotatable sprocket member positioned in said housing, an arcuate passageway extending through said housing tangentially about at least a portion of said sprocket member, and a plurality of juxtaposed spheres positioned in said passageway and engaged by said sprocket member, the improvement therein of the portion of said passageway extending tangentially about said sprocket member having a surface facing said sprocket member which is flat in the dimension extending parallel to the axis or rotation of said sprocket member and is curved on a radius from the axis of rotation of said sprocket member.

10. A power transfer system comprising a housing, a sprocket member rotatably mounted in said housing and including a series of spaced outwardly extending teeth, ball members positioned between all of the teeth of said sprocket member, and power transfer means in engagement with at least one of the ball members positioned between the teeth of said sprocket member.

* * * * *